(12) United States Patent
Masui

(10) Patent No.: US 10,168,602 B2
(45) Date of Patent: Jan. 1, 2019

(54) PROJECTION OPTICAL SYSTEM AND PROJECTOR

(71) Applicant: Konica Minolta, Inc., Tokyo (JP)

(72) Inventor: Atsuo Masui, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/827,228

(22) Filed: Nov. 30, 2017

(65) Prior Publication Data

US 2018/0149951 A1    May 31, 2018

(30) Foreign Application Priority Data

Nov. 30, 2016 (JP) .................. 2016-232299

(51) Int. Cl.
| | | |
|---|---|---|
| G03B 21/14 | (2006.01) | |
| G02B 9/62 | (2006.01) | |
| G02B 7/10 | (2006.01) | |
| G02B 15/14 | (2006.01) | |

(52) U.S. Cl.
CPC ............... *G03B 21/14* (2013.01); *G02B 7/10* (2013.01); *G02B 9/62* (2013.01); *G02B 15/14* (2013.01)

(58) Field of Classification Search
CPC . G03B 21/14; G02B 7/10; G02B 9/62; G02B 15/14
USPC ........................................................ 359/676
See application file for complete search history.

(56) References Cited

U.S. PATENT DOCUMENTS

| | | | | | |
|---|---|---|---|---|---|
| 5,132,846 A | * | 7/1992 | Estelle | ................... | G02B 13/24 |
| | | | | | 359/676 |
| 2004/0070844 A1 | * | 4/2004 | Sato | ..................... | G02B 27/646 |
| | | | | | 359/687 |

FOREIGN PATENT DOCUMENTS

| | | |
|---|---|---|
| JP | 2013-024965 A | 2/2013 |
| JP | 2013-161000 A | 8/2013 |

* cited by examiner

*Primary Examiner* — James Greece
(74) *Attorney, Agent, or Firm* — Yuichi Watanabe

(57) ABSTRACT

A projection optical system projects, while enlarging, an image displayed on an image display surface and performs zooming by moving a plurality of lens groups arranged along a same optical axis. The projection optical system includes, from an enlargement side: a first lens group having a negative refractive power; a second lens group having a negative refractive power and movable during zooming; a third lens group having a positive refractive power and movable during zooming; and a lens group disposed at a most reduction-side position. The first lens group includes, from the enlargement side: a front group having a negative refractive power; and a rear group having a positive refractive power and including, from the enlargement side, a negative lens element and a positive lens element. For zooming from a wide-angle end to a telephoto end, the third lens group moves toward the enlargement side monotonically.

10 Claims, 9 Drawing Sheets

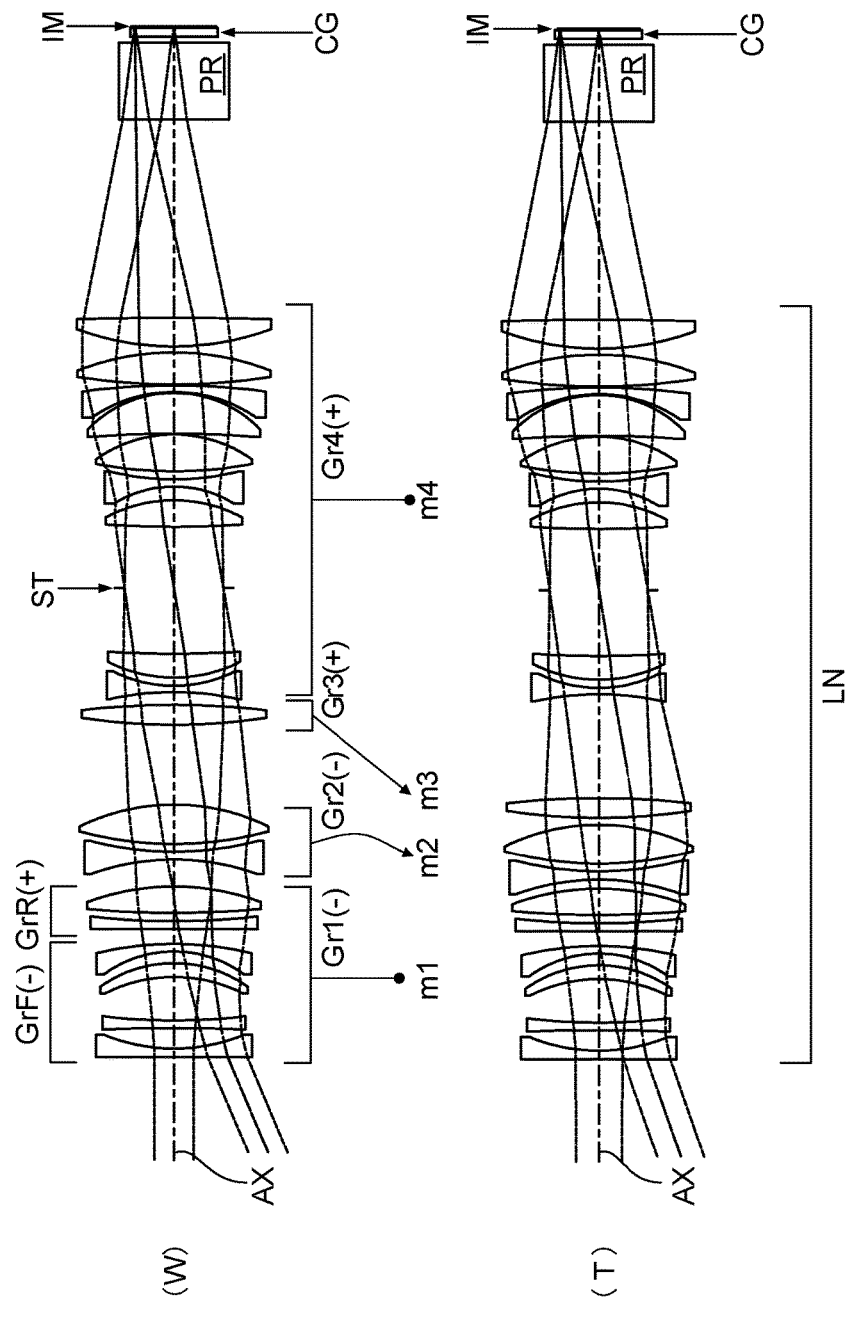

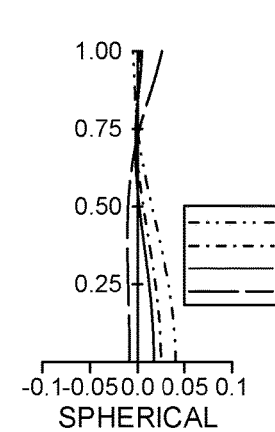
FIG.5A EX1-W
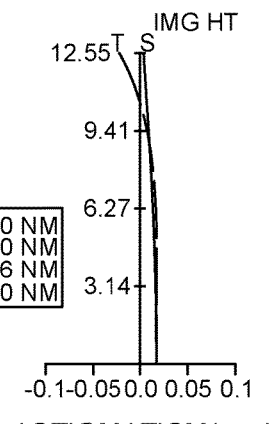
FIG.5B EX1-W
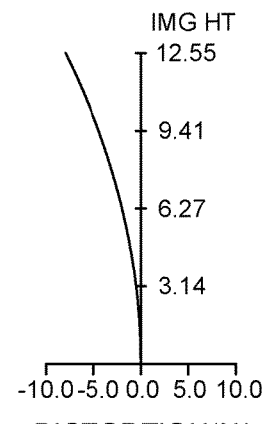
FIG.5C EX1-W
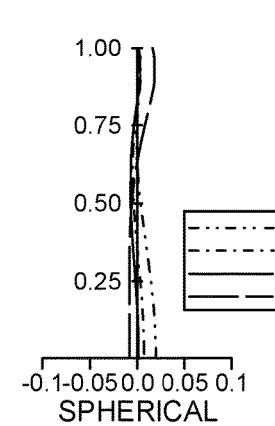
FIG.5D EX1-M
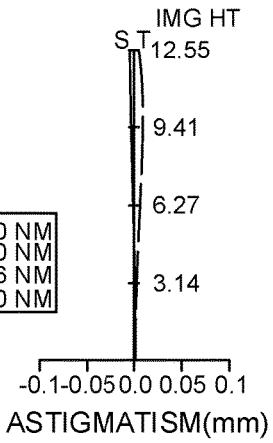
FIG.5E EX1-M
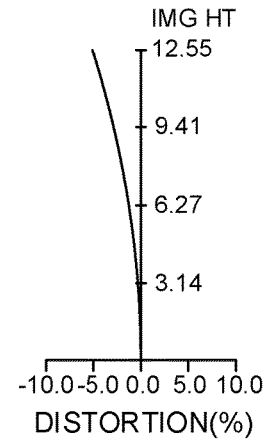
FIG.5F EX1-M
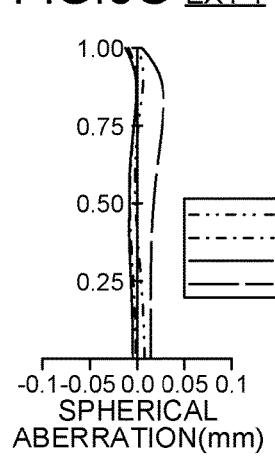
FIG.5G EX1-T
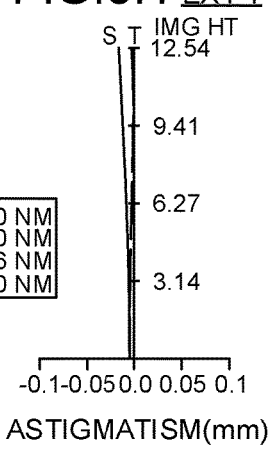
FIG.5H EX1-T
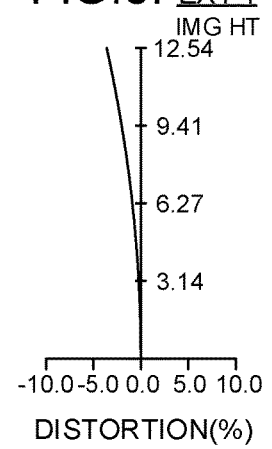
FIG.5I EX1-T

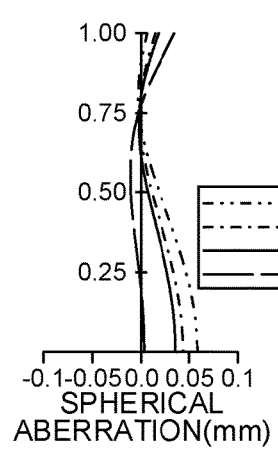
FIG.6A EX2-W
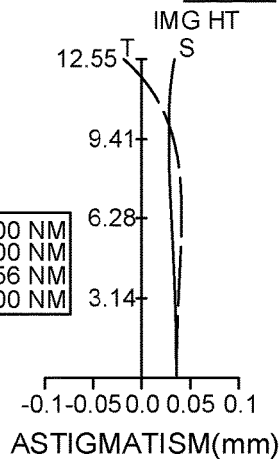
FIG.6B EX2-W
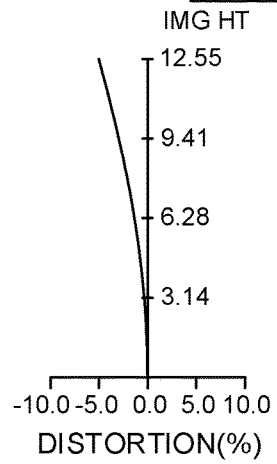
FIG.6C EX2-W
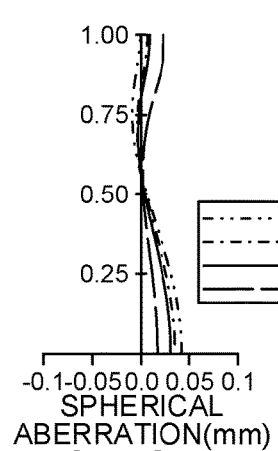
FIG.6D EX2-M
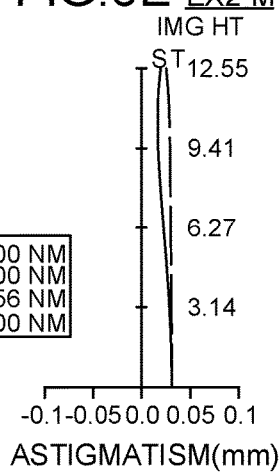
FIG.6E EX2-M
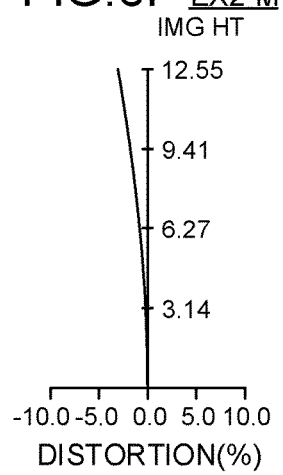
FIG.6F EX2-M
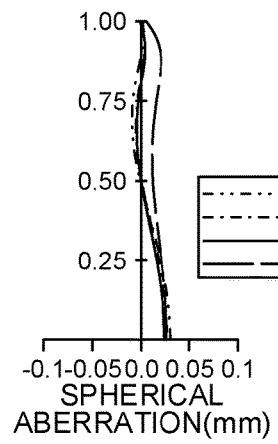
FIG.6G EX2-T
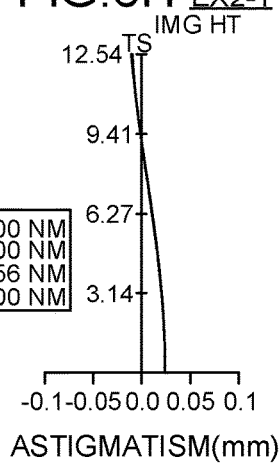
FIG.6H EX2-T
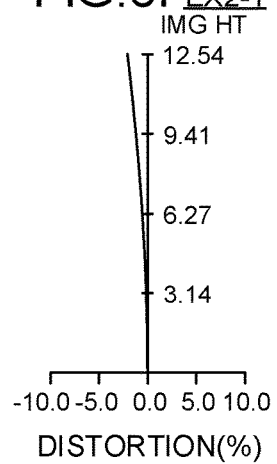
FIG.6I EX2-T

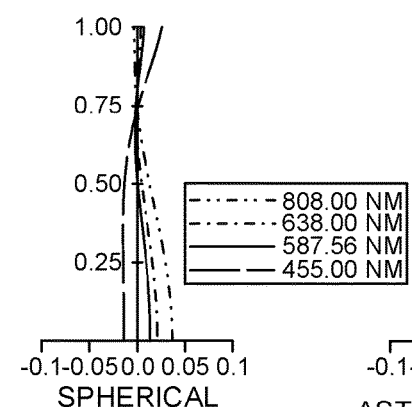
FIG.7A EX3-W
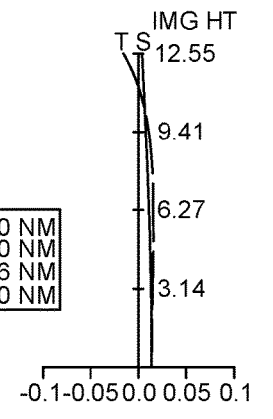
FIG.7B EX3-W
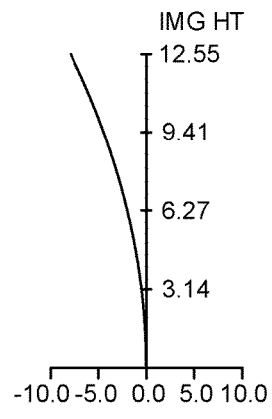
FIG.7C EX3-W
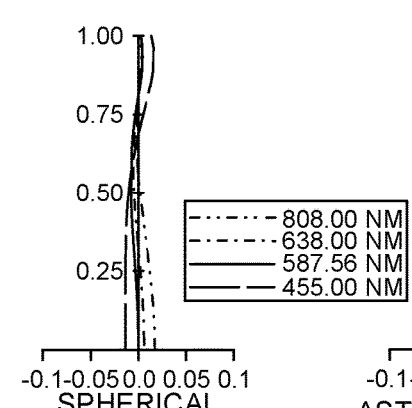
FIG.7D EX3-M
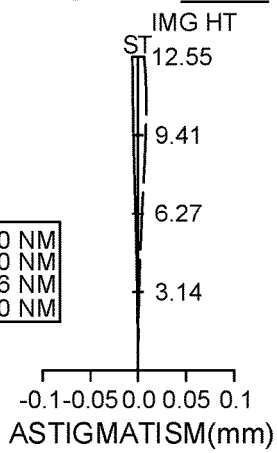
FIG.7E EX3-M
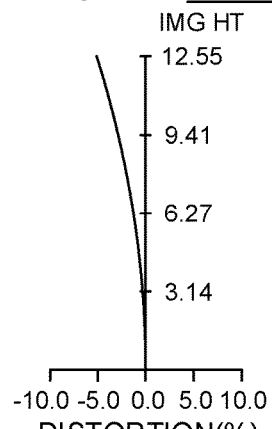
FIG.7F EX3-M
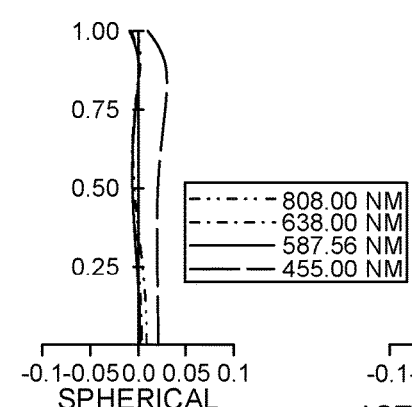
FIG.7G EX3-T
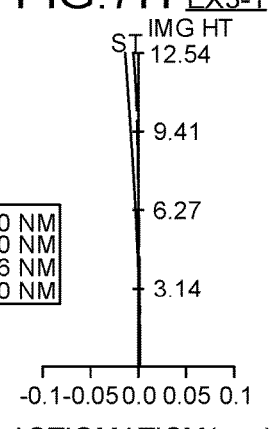
FIG.7H EX3-T
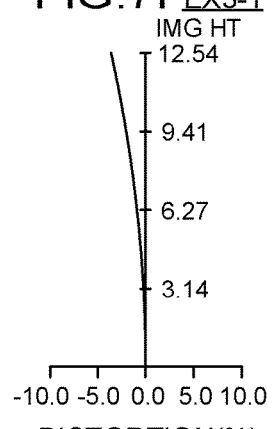
FIG.7I EX3-T

FIG. 8A EX4-W
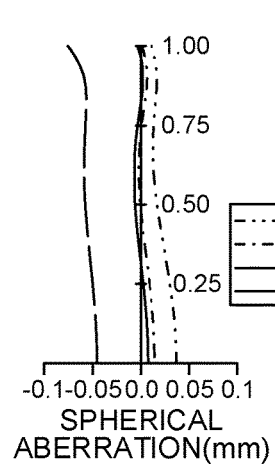
SPHERICAL ABERRATION(mm)
FIG. 8B EX4-W
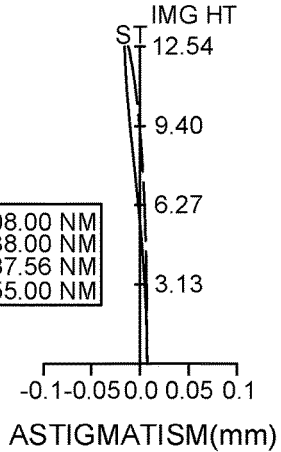
ASTIGMATISM(mm)
FIG. 8C EX4-W
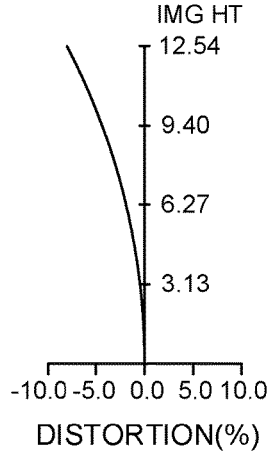
DISTORTION(%)
FIG. 8D EX4-M
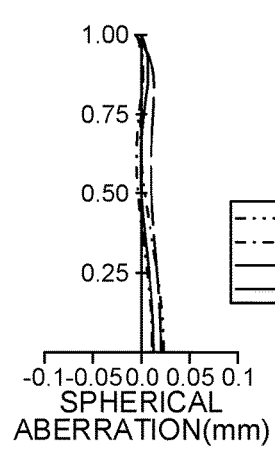
SPHERICAL ABERRATION(mm)
FIG. 8E EX4-M
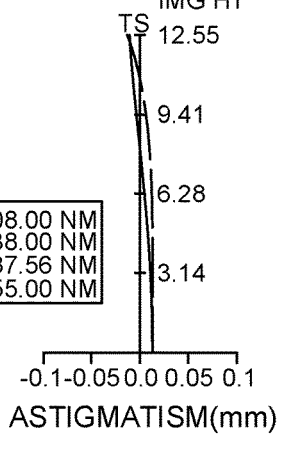
ASTIGMATISM(mm)
FIG. 8F EX4-M
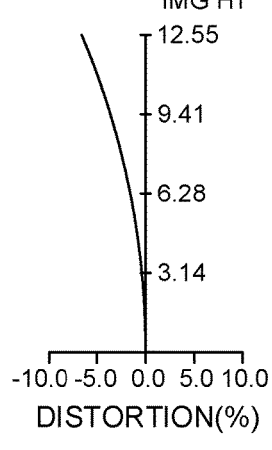
DISTORTION(%)
FIG. 8G EX4-T
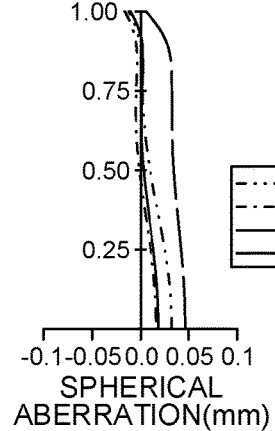
SPHERICAL ABERRATION(mm)
FIG. 8H EX4-T
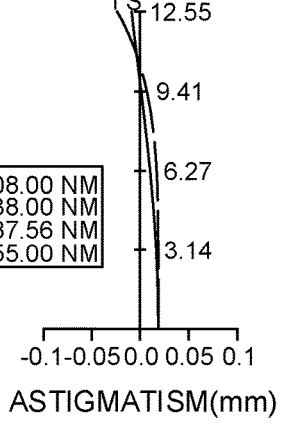
ASTIGMATISM(mm)
FIG. 8I EX4-T
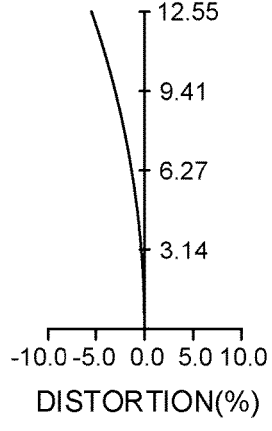
DISTORTION(%)

PROJECTION OPTICAL SYSTEM AND PROJECTOR

CROSS-REFERENCE TO RELATED APPLICATIONS

The entire disclosure of Japanese Patent Application No. 2016-232299, filed on Nov. 30, 2016, is incorporated herein by reference in its entirety.

BACKGROUND

1. Technical Field

The present invention relates to a projection optical system that projects, while enlarging, an image displayed on an image display surface. More particularly, the present invention relates to a zoomable projection optical system that offers satisfactory optical performance in a wide wavelength range, and to a projector incorporating such a projection optical system.

2. Description of the Related Art

As zoomable projection optical systems, zoom lens systems for projectors are proposed in Patent Documents 1 and 2 identified below. On the other hand, recent years have seen the emergence of solid light sources (for example, laser light sources) which have wide wavelength ranges and thus cover wide color gamuts; correspondingly, projection optical systems have come to be required to offer satisfactory chromatic aberration performance in wider-than-ever wavelength ranges. In particular, zoom lens systems are prone to zooming-induced variation of chromatic aberration, which makes it more difficult to correct chromatic aberration in a wide wavelength range. That can be effectively corrected with a first lens group in which ray passage heights differ between at the wide-angle end and the telephoto end, but even then, since the beam width of axial rays is small in the first lens group, axial chromatic aberration is still difficult to correct. Another way is to use, in addition to a group that performs zooming, a movable group that exerts an effect of correcting axial chromatic aberration, but in that case, the amount of movement of the axial-chromatic-aberration correction group is so large as to result in an increased size of the optical system.

Patent Document 1: Japanese Patent Application published as No. 2013-161000
Patent Document 2: Japanese Patent Application published as No. 2013-24965

For example, the zoom lens system disclosed in Patent Document 1 does not include an axial-chromatic-aberration correction group which requires a large amount of movement, and is thus built as a compact optical system. However, because of the small beam width of axial light in the rear group in the first lens group, axial chromatic aberration cannot be corrected sufficiently. On the other hand, the zoom lens system disclosed in Patent Document 2 has a power arrangement that gives a large beam width of axial light in the rear group in the first lens group. However, axial chromatic aberration is corrected by increasing the amount of movement of the second lens group in addition to the third lens group as a zooming group, and this results in an increased size of the optical system. Thus, projection optical systems are sought that offer satisfactory axial chromatic aberration performance even in a wide wavelength range without an increase in the size of the optical system.

SUMMARY

One or more embodiments of the present invention aim to provide a compact, zoomable projection optical system that allows good use of the performance of a solid light source by securing satisfactory chromatic aberration performance even in a wide wavelength range, and to provide a projector incorporating such a projection optical system.

A projection optical system reflecting one or more embodiments of the present invention, which projects, while enlarging, an image displayed on an image display surface and which performs zooming by moving a plurality of lens groups arranged along the same optical axis, includes, from the enlargement side: a first lens group having a negative refractive power; a second lens group having a negative refractive power and movable during zooming; a third lens group having a positive refractive power and movable during zooming; and at least one lens group disposed at the most reduction-side position. The first lens group includes, from the enlargement side: a front group having a negative refractive power; and a rear group having a positive refractive power and including two, namely from the enlargement side a negative and a positive, single lens elements. For zooming from the wide-angle end to the telephoto end, the third lens group moves toward the enlargement side monotonically. Moreover, conditional formulae (1) and (2) below are fulfilled:

$$0.3 < |f1f|/L1r < 1.4 \quad (1)$$

$$0.1 < L2\max/L3\max < 0.3 \quad (2)$$

where
f1f represents the focal length of the front group;
L1r represents the distance from the vertex of the most enlargement-side surface in the front group to the vertex of the most enlargement-side surface in the rear group;
L2max represents the maximum amount of movement of the second lens group; and
L3max represents the maximum amount of movement of the third lens group.

According to one or more embodiments of the present invention, a projector includes: an image display element having an image display surface; and a projection optical system as described above which projects, while enlarging, the image displayed on the image display surface onto a screen surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is an optical construction diagram of a fourth embodiment (Example 4) of the present invention;

FIGS. 5A to 5I are aberration diagrams of Example 1;
FIGS. 6A to 6I are aberration diagrams of Example 2;
FIGS. 7A to 7I are aberration diagrams of Example 3;
FIGS. 8A to 8I are aberration diagrams of Example 4.

DETAILED DESCRIPTION OF EMBODIMENTS

Figure 1:
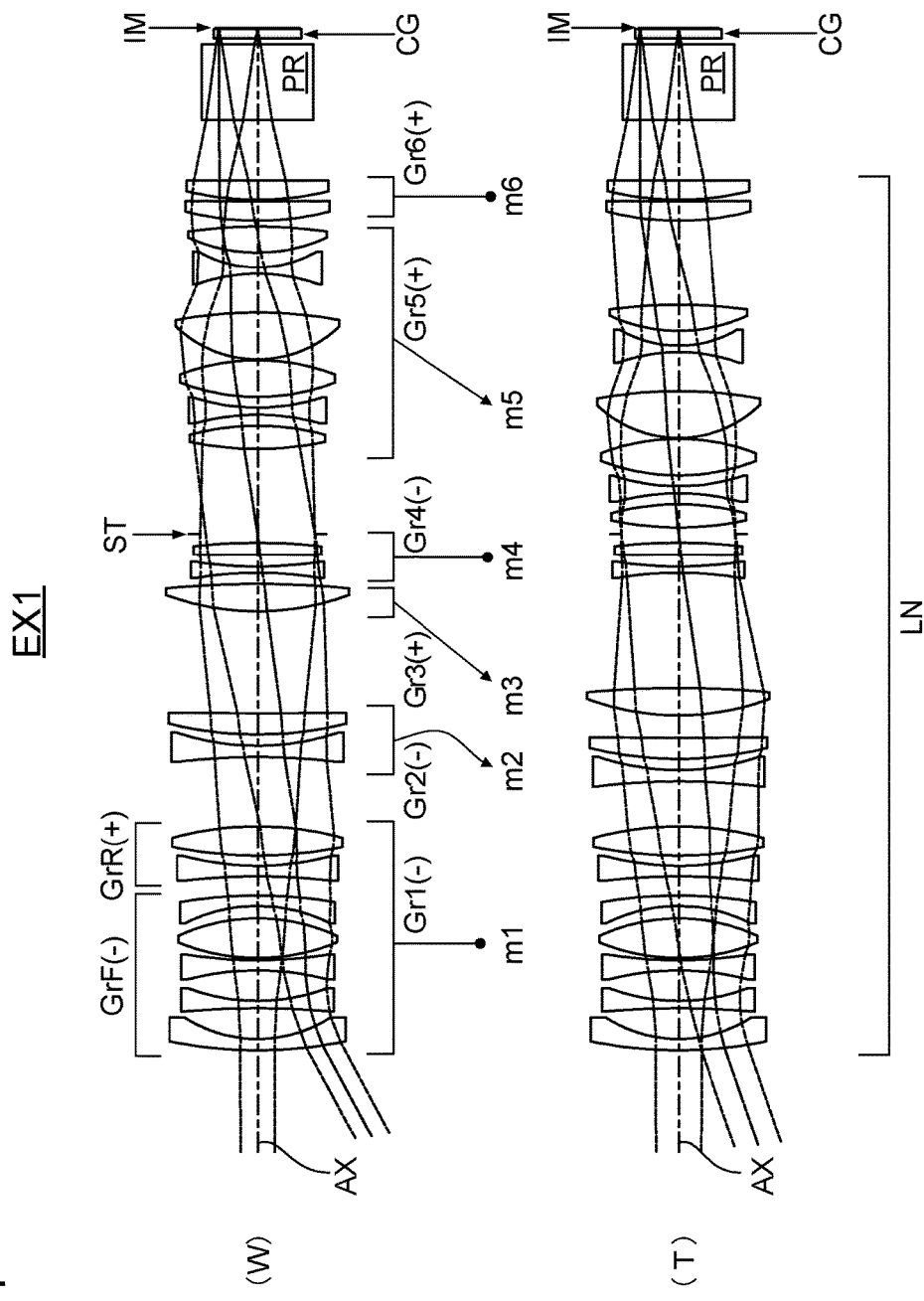
FIG. 1 is an optical construction diagram of a first embodiment (Example 1) of the present invention.
Figure 2:
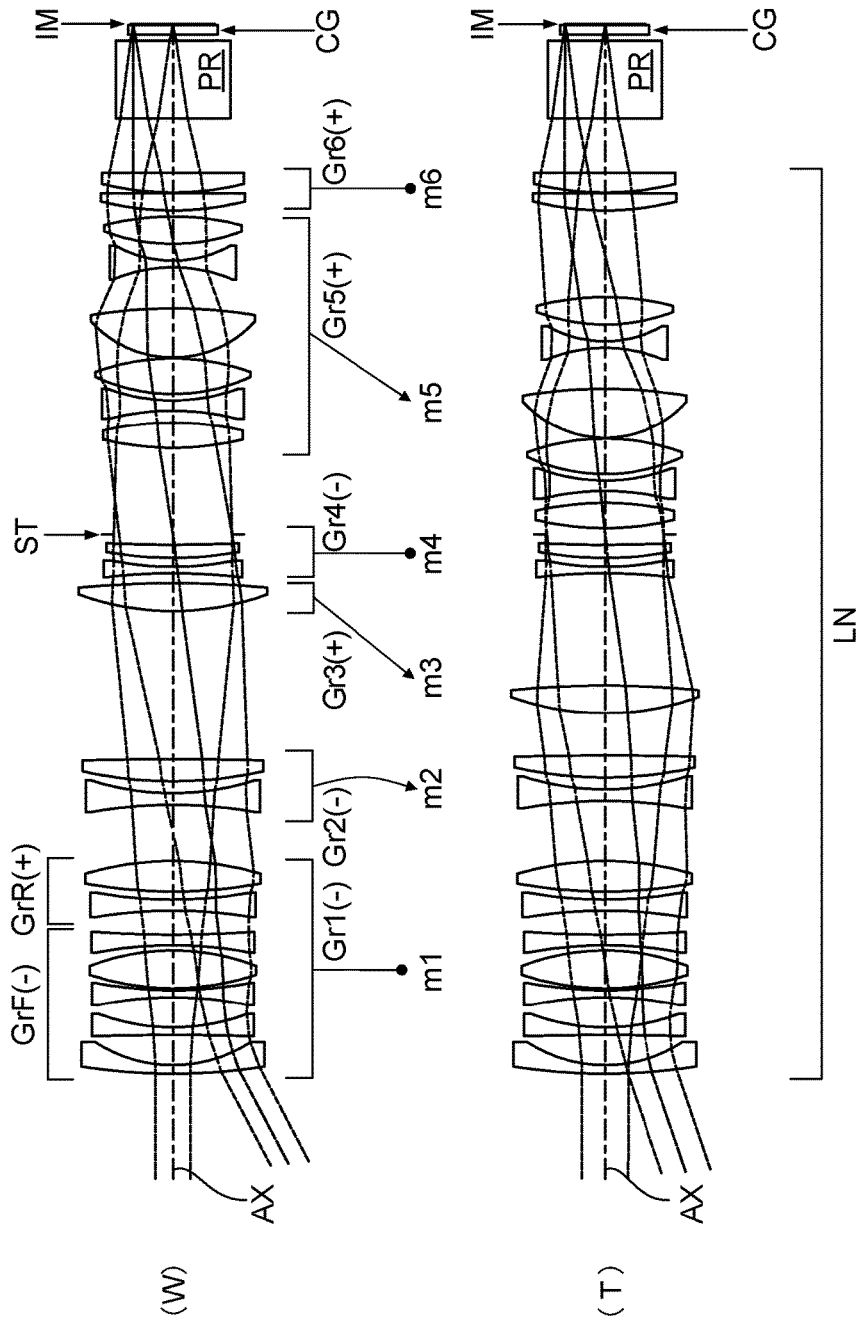
FIG. 2 is an optical construction diagram of a second embodiment (Example 2) of the present invention.
Figure 3:
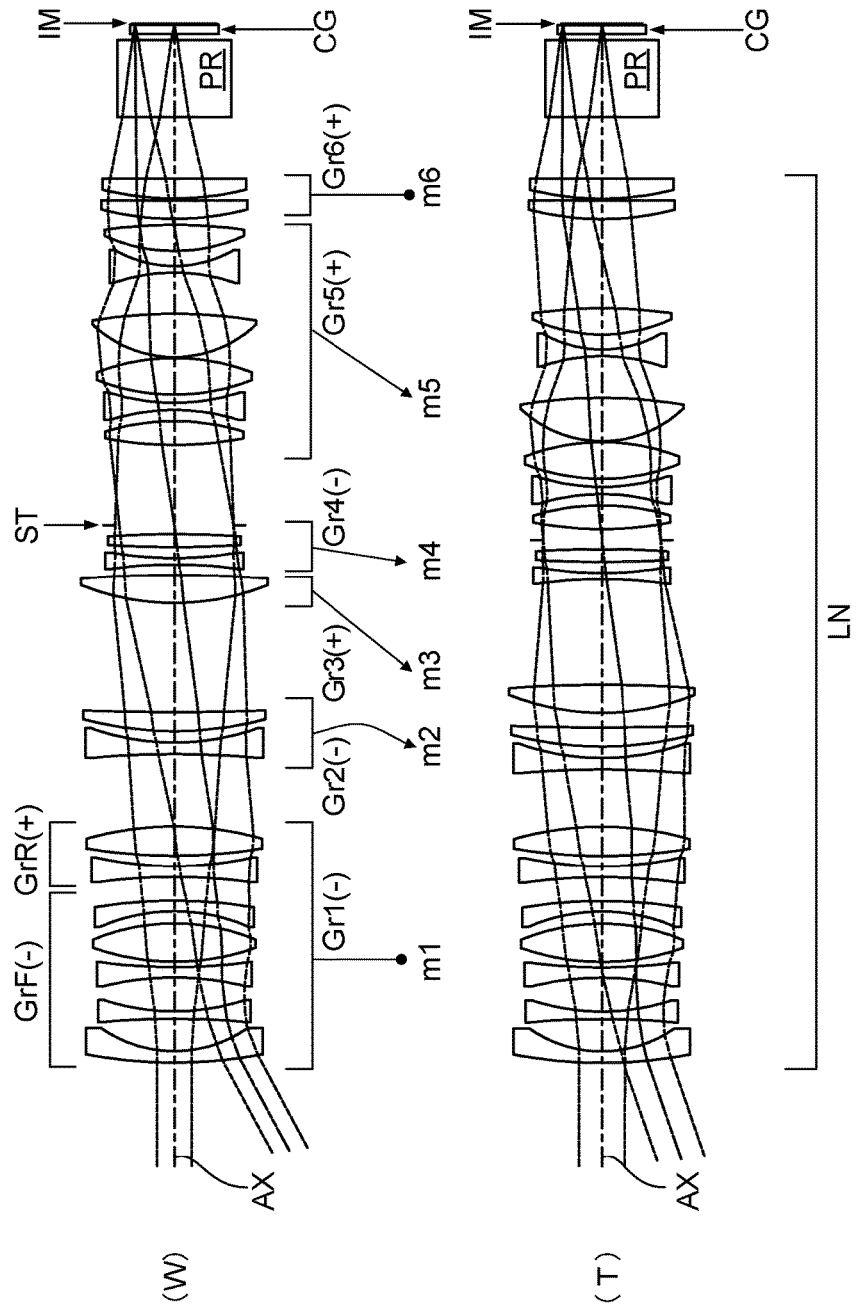
FIG. 3 is an optical construction diagram of a third embodiment (Example 3) of the present invention.

Hereinafter, projection optical systems, projectors, and the like according to one or more embodiments of the present invention will be described. However, the scope of the invention is not limited to the disclosed embodiments.

A projection optical system according to one or more embodiments of the present invention is a projection optical system that projects, while enlarging, an image displayed on an image display surface and that achieves zooming by moving a plurality of lens groups arranged along the same optical axis. The projection optical system includes, from the enlargement side, a first lens group having a negative refractive power, a second lens group having a negative refractive power and movable during zooming, a third lens group having a positive refractive power and movable during zooming, and at least one lens group at the most reduction-side position. The first lens group is composed of, from the enlargement side, a front group having a negative refractive power and a rear group having a positive refractive power, the latter being composed of, from the enlargement side, two, namely a negative and a positive, single lens elements. During zooming from the wide-angle end to the telephoto end, the third lens group moves toward the enlargement side monotonically. Moreover, conditional formulae (1) and (2) below are fulfilled.

$$0.3 < |flf|/L1r < 1.4 \quad (1)$$

$$0.1 < L2max/L3max < 0.3 \quad (2)$$

where
  flf represents the focal length of the front group;
  L1r represents the distance from the vertex of the most enlargement-side surface in the front group to the vertex of the most enlargement-side surface in the rear group;
  L2max represents the maximum amount of movement of the second lens group; and
  L3max represents the maximum amount of movement of the third lens group.

Here, the "enlargement side" is in the direction of the screen surface (enlargement-side image surface) on which the enlarged optical image is projected (and is thus the so-called front side), and the opposite direction is the "reduction side", that is, in the direction of the image display element (for example, a digital micromirror device) at which the original optical image is displayed on the image display surface (reduction-side image surface) (and is thus the so-called rear side).

Arranging, from the enlargement side, a first, negative, lens group and a second, negative, lens group helps reduce the lens diameter of the projection optical system. Disposing a third, positive, lens group exerting a zooming effect makes it possible to perform zooming while correcting the negative distortion occurring in the first and second, both negative, lens groups. Where, as here, zooming is performed chiefly with the third lens group, axial chromatic aberration tends to vary during zooming. An effective way of reducing variation of axial chromatic aberration during zooming is to correct axial chromatic aberration with the first lens group. Accordingly, to correct axial chromatic aberration, in a reduction-side part of the first lens group, a positive rear group is disposed which is composed of a negative and a positive lens element.

Conditional formula (1) defines the condition for correcting axial chromatic aberration effectively with the rear group in the first lens group. Above the upper limit of conditional formula (1), either the refractive power of the front group in the first lens group is too low or the rear group is too close to the enlargement side. Thus, axial rays pass at low positions in the rear group, resulting in a diminished effect of correcting axial chromatic aberration. Below the lower limit of conditional formula (1), rays pass at too high positions in the rear group in the first lens group, leading to an increased size of the optical system. Accordingly, fulfilling conditional formula (1) helps achieve a good balance between compactness and enhanced axial chromatic aberration performance in the projection optical system.

Conditional formula (2) defines the amount of movement of the second lens group relative to the third lens group, which is a zooming group. Above the upper limit of conditional formula (2), the amount of movement of the second lens group is too large, resulting in an increased size of the optical system. On the other hand, if the amount of movement of the third lens group is too small, a diminished zooming effect results, leading to restrictions on where to place the projection optical system. Below the lower limit of conditional formula (2), the amount of movement of the second lens group is too small, resulting in a diminished effect of correcting back variation in the third lens group during zooming. On the other hand, if the amount of movement of the third lens group is too large, zooming-induced variation of axial chromatic aberration is so large as to be difficult to correct. Accordingly, fulfilling conditional formula (2) helps achieve compactness and enhanced axial chromatic aberration performance in the projection optical system with a good balance while retaining the zooming effect.

With a projection optical system having the above-described distinctive construction, it is possible to build a compact, zoomable projection optical system that allows good use of the performance of a solid light source by securing satisfactory chromatic aberration performance even in a wide wavelength range. Employing such a projection optical system in projectors contributes to making them high-performance, versatile, compact, and so forth. Conditions for obtaining such benefits with a good balance, and for achieving still higher optical performance, further compactness, and the like will now be described.

In one or more embodiments, conditional formula (1a) below is fulfilled.

$$0.8 < |flf|/L1r < 1.0 \quad (1a)$$

Conditional formula (1a) defines, within the conditional range defined by conditional formula (1), a further conditional range from the above-mentioned and other perspectives. Accordingly, fulfilling conditional formula (1a) helps augment the above-mentioned benefits.

In one or more embodiments, conditional formula (3) below is fulfilled.

$$vp - vm > 0 \quad (3)$$

where
  vp represents the dispersion of the positive lens element in the rear group; and
  vm represents the dispersion of the negative lens element in the rear group.

Conditional formula (3) defines the condition for effectively correcting axial chromatic aberration with the rear group in the first lens group. Giving the negative and positive lens elements constituting the rear group dispersions (that is, Abbe numbers) that fulfill conditional formula (3) makes it possible to more effectively correct the variation of axial chromatic aberration occurring in the third lens group.

In one or more embodiments, conditional formula (3a) below, which defines a more suitable condition, is fulfilled.

$$vp-vm>10 \qquad (3a)$$

Conditional formula (3a) defines, within the conditional range defined by conditional formula (3), a further conditional range from the above-mentioned and other perspectives. Accordingly, fulfilling conditional formula (3a) helps augment the above-mentioned benefits.

In one or more embodiments, the front group is composed of two or more lens elements. Furnishing the front group in the first lens group with two or more lens elements makes it possible to suppress off-axial aberration, in particular distortion, in the front group, which requires a refractive power for correcting axial chromatic aberration in the rear group, and thus helps achieve still higher performance.

In one or more embodiments, the front group includes at least one positive lens element. Furnishing the front group in the first lens group with at least one positive lens element helps correct still more effectively the distortion occurring in the first lens group.

In one or more embodiments, the first lens group remains stationary during zooming. This construction helps reduce the variation of off-axial aberration, such as distortion, occurring in the first lens group during zooming.

In one or more embodiments, during zooming from the wide-angle end to the telephoto end, the second lens group moves while describing a locus convex to the reduction side. Where zooming is performed with the third lens group, correcting back variation during zooming requires a large amount of movement of the second lens group. As a result, the total lens length tends to be long. By moving the second lens group such that it describes a locus convex to the reduction side, it is possible to suppress back variation effectively without increasing the amount of movement of the second lens group.

In one or more embodiments, the projection optical system has, on the reduction side of the third lens group, from the enlargement side, a fourth lens group having a negative refractive power, a fifth lens group having a positive refractive power, and a sixth lens group having a positive refractive power, and at least the fifth lens group is movable during zooming. Increasing, in this way, the number of lens groups movable during zooming to exert an additional zooming effect makes it possible to reduce the amount of movement of the third lens group, and helps reduce variation of axial chromatic aberration ascribable to the third lens group during zooming. Moreover, disposing lens groups having positive refractive powers at the reduction side helps obtain satisfactory telecentricity, and makes it possible to take in illumination light efficiently. Furthermore, arranging the fourth lens group having a negative refractive power close to an aperture stop relative to those positive lens groups make it possible to correct axial chromatic aberration more effectively.

In one or more embodiments, conditional formula (4) is fulfilled.

$$0.1<|flf/flr|<0.5 \qquad (4)$$

where
flf represents the focal length of the front group; and
flr represents the focal length of the rear group.

Conditional formula (4) defines the refractive power ratio between the front and rear groups in the first lens group. Below the lower limit of conditional formula (4), that is, if the refractive power of the front group is too high, the distortion occurring in the front group tends to increase. On the other hand, if the refractive power of the rear group is too low, off-axial rays pass at high positions (that is, positions far away from the optical axis) in the second and third lens groups, and thus the lens diameter tends to be large; in addition, the off-axial aberration (in particular, lateral chromatic aberration) ascribable to the third lens group during zooming exhibits large variation. Above the upper limit of conditional formula (4), that is, if the refractive power of the front group is too low, axial rays pass at low positions in the rear group, and this makes it difficult to correct axial chromatic aberration. On the other hand, if the refractive power of the rear group is too high, though it is possible to reduce the diameters of the second and third lens groups, off-axial aberration has to be corrected almost by the first lens group alone, and thus off-axial aberration (in particular, curvature of field) tends to increase. Accordingly, by fulfilling conditional formula (4), it is possible to achieve compactness and high performance with a better balance in the zoom lens system.

As for wavelength range, the projection optical system in one or more embodiments is usable with light of a wavelength of 800 nm or more. Securing a wavelength range that is wide on the infrared side in this way helps secure a wider color gamut.

Next, by way of a first to a fourth embodiments of the present invention, specific optical constructions of the projection optical system LN having a zooming function will be described. FIGS. 1 to 4 are optical construction diagrams corresponding to the projection optical system LN according to the first to fourth embodiments respectively, and show, in an optical section, the lens sectional shape, lens arrangement, optical path, and the like of the projection optical system LN, which is a zoom lens system, as observed at each of the wide-angle end (W) and the telephoto end (T). In FIGS. 1 to 4, a movement locus mj (j=1, 2 ... 6) schematically shows how the j-th lens group Grj (j=1, 2 ... 6) moves or remains stationary during zooming from the wide-angle end (W) to the telephoto end (T). Thus, in the projection optical system LN, the movable groups are moved relative to the image display surface IM so as to vary the axial distances between the individual lens groups, and thereby zooming from the wide-angle end (W) to the telephoto end (T) is achieved. On the reduction side of the projection optical system LN, there are arranged a prism PR (for example, a TIR (total internal reflection) prism, a color separation/integration prism, or the like) and a cover glass CG of an image display element such that these remain stationary during zooming.

In the first to third embodiments, the projection optical system LN is composed of, from the enlargement side, a first lens group Gr1 having a negative refractive power, a second lens group Gr2 having a negative refractive power, a third lens group Gr3 having a positive refractive power, a fourth lens group Gr4 having a negative refractive power, a fifth lens group Gr5 having a positive refractive power, and a sixth lens group Gr6 having a positive refractive power; is a six-component zoom lens system (negative-negative-positive-negative-positive-positive) that achieves zooming by varying the distances between the individual lens groups;

and is so constructed that an image displayed on an image display surface IM is projected while being enlarged. On the other hand, in the fourth embodiment, the projection optical system LN is composed of, from the enlargement side, a first lens group Gr1 having a negative refractive power, a second lens group Gr2 having a negative refractive power, a third lens group Gr3 having a positive refractive power, and a fourth lens group Gr4 having a positive refractive power; is a four-component zoom lens system (negative-negative-positive-positive) that achieves zooming by varying the distances between the individual lens groups; and is so constructed that an image displayed on an image display surface IM is projected while being enlarged.

The first to fourth embodiments are all built as a spherical lens system including no aspherical surface and adopt a construction where the fourth lens group Gr4 includes an aperture stop ST. Moreover, the first lens group Gr1 is composed of a front group GrF, which is negative, and a rear group GrR, which is positive; at least the second and third lens groups Gr2 and Gr3 are movable groups; and conditional formulae (1) and (2) noted earlier are fulfilled. It is thus possible to secure, despite a compact size, satisfactory chromatic aberration performance to allow good use of the performance of a solid light source even in a wide wavelength range.

In the first embodiment (FIG. 1), the front group GrF is composed of a negative meniscus lens element concave to the reduction side, two biconcave negative lens elements, a biconvex positive lens element, and a negative meniscus lens element concave to the enlargement side, and the rear group GrR is composed of a biconcave negative lens element and a biconvex positive lens element (negative-negative-negative-positive-negative+negative-positive). In the second embodiment (FIG. 2), the front group GrF is composed of a negative meniscus lens element concave to the reduction side, two biconcave negative lens elements, a biconvex positive lens element, and a biconcave negative lens element, and the rear group GrR is composed of a biconcave negative lens element and a biconvex positive lens element (negative-negative-negative-positive-negative+negative-positive). In the third embodiment (FIG. 3), the front group GrF is composed of a negative meniscus lens element concave to the reduction side, two biconcave negative lens elements, a biconvex positive lens element, and a negative meniscus lens element concave to the enlargement side, and the rear group GrR is composed of a biconcave negative lens element and a biconvex positive lens element (negative-negative-negative-positive-negative+negative-positive). In the fourth embodiment (FIG. 4), the front group GrF is composed of two biconcave negative lens elements, a positive meniscus lens element convex to the reduction side, and a negative meniscus lens element concave to the enlargement side, and the rear group GrR is composed of a plano-concave negative lens element concave to the reduction side and a biconvex positive lens element (negative-negative–positive-negative+negative-positive).

Figure 9:
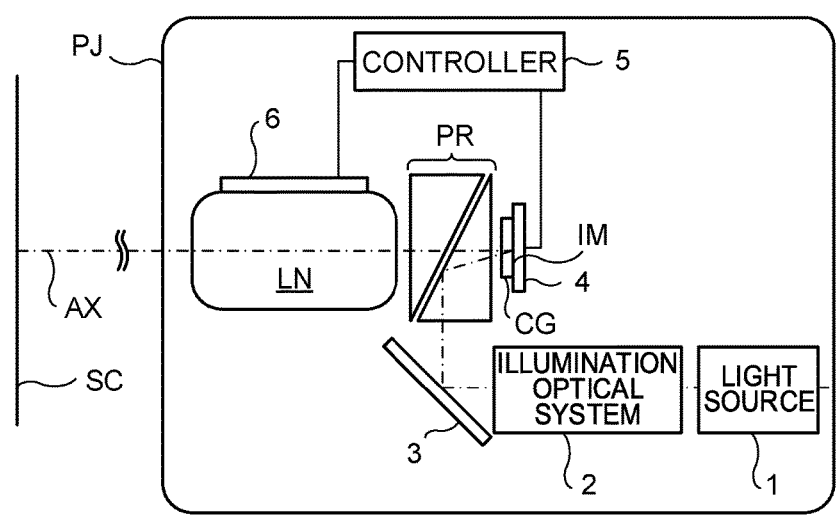
FIG. 9 is a schematic diagram showing a projector according to one or more embodiments of the present invention.

Next, a projector according to one or more embodiments of the present invention which incorporates the projection optical system LN described above will be described. FIG. 9 schematically shows an example of the configuration of the projector PJ. The projector PJ includes a light source 1, an illumination optical system 2, a reflecting mirror 3, a prism PR, an image display element (image forming element) 4, a controller 5, an actuator 6, a projection optical system LN, and the like. The controller 5 governs the overall control of the projector PJ. The image display element 4 is an image modulating element (for example, a digital micromirror device) that generates an image by modulating light; it has an image display surface IM on which it displays an image, and is, on the image display surface IM, provided with a cover glass CG.

The light emergent from the light source 1 (for example, a laser light source, or a white light source such as a xenon lamp) is directed through the illumination optical system 2, the reflecting mirror 3, and the prism PR to the image display element 4, so that on the image display element 4, image light is formed. The prism PR is, for example, a TIR prism (or a color separation/integration prism), and serves, among others, to separate projection light from illumination light. The image light formed by the image display element 4 is projected, while being enlarged, by the projection optical system LN toward a screen surface SC. That is, the image IM displayed on the image display element 4 is projected, while being enlarged, through the projection optical system LN onto the screen surface SC.

As described above, the projector PJ includes an image display element 4 for displaying an image, a light source 1, a illumination optical system 2 for directing the light from the light source 1 to the image display element 4, and a projection optical system LN for projecting, while enlarging, the image displayed on the image display element 4 onto the screen surface SC. However, this is not meant to limit projectors to which the projection optical system LN can be applied. For example, using an image display element that displays an image with light emission at the image display surface IM itself eliminates the need for illumination. In that case, a projector can be built without using a light source 1 or an illumination optical system 2.

Those lens groups in the projection optical system LN which are moved for zooming and focusing are respectively connected to the actuator 6, which moves them to the enlargement or reduction side along the optical axis AX. The actuator 6 is connected to the controller 5, which controls the movement of the movable groups. The controller 5 and the actuator 6 may be omitted, in which case the relevant lens groups can be moved manually.

EXAMPLES

Hereinafter, the construction and the like of projection optical systems embodying one or more embodiments of the present invention will be described more specifically with reference to the construction data and the like of practical examples. Examples 1 to 4 (EX 1 to EX 4) presented below are numerical examples corresponding to the first to fourth embodiments, respectively, described above, and the optical construction diagrams (FIGS. 1 to 4) showing the first to fourth embodiments also show the lens sectional shape, lens arrangement, optical path, and the like of the corresponding ones of Examples 1 to 4 respectively.

In the construction data of each practical example, listed as surface data are, from left to right, the surface number i, the paraxial radius of curvature r (mm), the axial surface-to-surface distance d (mm), the refractive index nd for the d-line (with a wavelength of 587.56 nm), and the Abbe number vd for the d-line. The surface number i is the position in order from the enlargement side, the object surface (object) corresponding to the screen surface (enlargement-side image surface) SC (FIG. 9), the image surface (image) corresponding to the image display surface (reduction-side image surface) IM.

Listed as miscellaneous data for each of Examples 1 to 4 are the zoom ratio and, for each of different focal length conditions W (wide), M (middle), and T (tele), the focal length of the entire system (Fl, mm), the f-number (Fno.), the half angle-of-view (ω, °), the image height (ymax, mm), the total lens length (TL, mm), the backfocus (BF, mm), and variable surface-to-surface distances (di, i representing the surface number, mm). Listed as zoom lens group data are the focal lengths (mm) of the respective lens groups. Here, the backfocus BF is given in terms of an air equivalent length of the distance from the last lens surface to the paraxial image surface, and the total lens length TL is the sum of the distance from the foremost lens surface to the last lens surface and the backfocus BF. The image height ymax corresponds to one-half of the diagonal length of the image display surface IM.

Table 1 shows, for each practical example, values corresponding to the conditional formulae along with related data. Here, listed as related data are the focal length (flf, mm) of the front group GrF, the focal length (flr, mm) of the rear group GrR, the distance (L1r, mm) from the vertex of the most enlargement-side surface in the front group GrF to the vertex of the most enlargement-side surface in the rear group GrR, the maximum amount of movement L2max of the second lens group Gr2, and the maximum amount of movement L3max of the third lens group Gr3.

FIGS. 5A to 5I, 6A to 6I, 7A to 7I, and 8A to 8I are aberration diagrams (longitudinal aberration diagrams in the infinity-focused condition) corresponding to Examples 1 to 4 (EX 1 to EX 4) respectively. Of these diagrams, those with figure numbers suffixed with A to C show aberrations observed at the wide-angle end W, those with figure numbers suffixed with D to F show aberrations observed in the middle-focal-length condition M, and those with figure numbers suffixed with G to I show aberrations observed at the telephoto end T. Of the diagrams, those with figure numbers suffixed with A, D, and G are spherical aberration diagrams, those with figure numbers suffixed with B, E, and H are astigmatism diagrams, and those with figure numbers suffixed with C, F, and I are distortion diagrams. In a case where the projection optical system LN of any of the practical examples is used in a projector PJ (FIG. 9), theoretically, the screen surface (projection surface) SC is the image surface and the image display surface IM is the object surface; however, in terms of optical design, each practical example is handled as a reduction system so that, with the screen surface SC taken as the object surface (object), optical performance is evaluated on the image display surface (reduction-side image surface) IM, which corresponds to the image surface (image).

In the spherical aberration diagrams, a dash-dot-dot line represents the amount of spherical aberration at a wavelength of 808.00 nm, a dash-and-dot line represents the amount of spherical aberration at a wavelength of 638.00 nm, a solid line represents the amount of spherical aberration at a wavelength of 587.56 nm (the d-line), and a broken line represents the amount of spherical aberration at a wavelength of 455.00 nm, all in terms of the deviation (in mm) from the paraxial image surface in the optical axis AX direction, the vertical axis representing the height of incidence on the pupil as normalized relative to the maximum height (that is, the relative pupil height). In the astigmatism diagrams, a broken line T represents the tangential image surface for the d-line, and a solid line S represents the sagittal image surface for the d-line, both in terms of the deviation (in mm) from the paraxial image surface in the optical axis AX direction, the vertical axis representing the image height (IMG HT, in mm). In the distortion diagrams, the horizontal axis represents the distortion (in %) for the d-line, and the vertical axis represents the image height (IMG HT, in mm).

In Example 1, the projection optical system LN includes a total of 20 lens elements, and is a six-component zoom lens system composed of, from the enlargement side, a first lens group Gr1 which is negative, a second lens group Gr2 which is negative, a third lens group Gr3 which is positive, a fourth lens group Gr4 which is negative, a fifth lens group Gr5 which is positive, and a sixth lens group Gr6 which is positive. The first, fourth, and sixth lens groups Gr1, Gr4, and Gr6 are stationary groups which remain stationary during zooming, and the second, third, and fifth lens groups Gr2, Gr3, and Gr5 are movable groups which are movable during zooming. For zooming from the wide-angle end (W) to the telephoto end (T), the second lens group Gr2 moves toward the enlargement side while describing a locus convex to the reduction side (movement locus m2), and the third and fifth lens groups Gr3 and Gr5 move toward the enlargement side monotonically (movement loci m3 and m5). The first lens group Gr1 is composed of, from the enlargement side, a front group GrF made up of five single lens elements, namely a negative, a negative, a negative, a positive, and a negative lens element, and a rear group GrR made up of two single lens elements, namely a negative and a positive lens element. Owing to these lens groups fulfilling conditional formulae (1) and (2), it is possible to obtain satisfactory axial chromatic aberration performance in a wide wavelength range of 450 to 820 nm.

In Example 2, the projection optical system LN includes a total of 20 lens elements, and is a six-component zoom lens system composed of, from the enlargement side, a first lens group Gr1 which is negative, a second lens group Gr2 which is negative, a third lens group Gr3 which is positive, a fourth lens group Gr4 which is negative, a fifth lens group Gr5 which is positive, and a sixth lens group Gr6 which is positive. The first, fourth, and sixth lens groups Gr1, Gr4, and Gr6 are stationary groups which remain stationary during zooming, and the second, third, and fifth lens groups Gr2, Gr3, and Gr5 are movable groups which are movable during zooming. For zooming from the wide-angle end (W) to the telephoto end (T), the second lens group Gr2 moves toward the reduction side while describing a locus convex to the reduction side (movement locus m2), and the third and fifth lens groups Gr3 and Gr5 move toward the enlargement side monotonically (movement loci m3 and m5). The first lens group Gr1 is composed of, from the enlargement side, a front group GrF made up of five single lens elements, namely a negative, a negative, a negative, a positive, and a negative lens element, and a rear group GrR made up of two single lens elements, namely a negative and a positive lens element. Owing to these lens groups fulfilling conditional formulae (1) and (2), it is possible to obtain satisfactory axial chromatic aberration performance in a wide wavelength range of 450 to 820 nm.

In Example 3, the projection optical system LN includes a total of 20 lens elements, and is a six-component zoom lens system composed of, from the enlargement side, a first lens group Gr1 which is negative, a second lens group Gr2 which is negative, a third lens group Gr3 which is positive, a fourth lens group Gr4 which is negative, a fifth lens group Gr5 which is positive, and a sixth lens group Gr6 which is positive. The first and sixth lens groups Gr1 and Gr6 are stationary groups which remain stationary during zooming, and the second to fifth lens groups Gr2 to Gr5 are movable groups which are movable during zooming. For zooming from the wide-angle end (W) to the telephoto end (T), the second lens group Gr2 moves toward the enlargement side while describing a locus convex to the reduction side (movement locus m2), and the third, fourth, and fifth lens groups Gr3, Gr4, and Gr5 move toward the enlargement side monotonically (movement loci m3, m4, and m5). The first lens group Gr1 is composed of, from the enlargement side, a front group GrF made up of five single lens elements, namely a negative, a negative, a negative, a positive, and a negative lens element, and a rear group GrR made up of two single lens elements, namely a negative and a positive lens element. Owing to these lens groups fulfilling conditional formulae (1) and (2), it is possible to obtain satisfactory axial chromatic aberration performance in a wide wavelength range of 450 to 820 nm.

In Example 4, the projection optical system LN includes a total of 18 lens elements, and is a four-component zoom lens system composed of, from the enlargement side, a first lens group Gr1 which is negative, a second lens group Gr2 which is negative, a third lens group Gr3 which is positive, and a fourth lens group Gr4 which is positive. The first and fourth lens groups Gr1 and Gr4 are stationary groups which remain stationary during zooming, and the second and third groups Gr2 and Gr3 are movable groups which are movable during zooming. For zooming from the wide-angle end (W) to the telephoto end (T), the second lens group Gr2 moves toward the enlargement side while describing a locus convex to the reduction side (movement locus m2), and the third lens group Gr3 moves toward the enlargement side monotonically (movement locus m3). The first lens group Gr1 is composed of, from the enlargement side, a front group GrF made up of four single lens elements, namely a negative, a negative, a positive, and a negative lens element, and a rear group GrR made up of two single lens elements, namely a negative and a positive lens element. Owing to these lens groups fulfilling conditional formulae (1) and (2), it is possible to obtain satisfactory axial chromatic aberration performance in a wide wavelength range of 450 to 820 nm.

Although embodiments of the present invention have been described and illustrated in detail, the disclosed embodiments are made for purposes of illustration and example only and not limitation. The scope of the present invention should be interpreted by terms of the appended claims.

Example 1

Unit: mm

Surface Data

| i | r | d | nd | vd |
|---|---|---|---|---|
| object(SC) | infinity | 3140.000 | | |
| 1 | 137.394 | 3.800 | 1.63854 | 55.45 |
| 2 | 42.278 | 10.276 | | |
| 3 | −273.408 | 2.500 | 1.49700 | 81.61 |
| 4 | 61.727 | 10.245 | | |
| 5 | −84.659 | 3.400 | 1.49700 | 81.61 |
| 6 | 140.604 | 0.727 | | |
| 7 | 65.491 | 13.296 | 1.54072 | 47.20 |
| 8 | −59.009 | 4.147 | | |
| 9 | −50.544 | 3.500 | 1.56883 | 56.04 |
| 10 | −144.955 | 6.434 | | |
| 11 | −197.517 | 3.600 | 1.75520 | 27.53 |
| 12 | 89.365 | 3.450 | | |
| 13 | 133.162 | 9.921 | 1.83481 | 42.72 |
| 14 | −100.099 | variable | | |
| 15 | −205.639 | 3.800 | 1.58144 | 40.89 |
| 16 | 79.550 | 3.759 | | |
| 17 | 115.198 | 7.086 | 1.90366 | 31.31 |
| 18 | 2630.402 | variable | | |
| 19 | 82.718 | 9.179 | 1.59282 | 68.62 |
| 20 | −297.238 | variable | | |
| 21 | −114.936 | 2.100 | 1.43700 | 95.10 |
| 22 | 126.698 | 3.900 | | |
| 23 | 1461.480 | 4.186 | 1.67270 | 32.17 |
| 24 | −176.075 | 3.000 | | |
| 25(ST) | infinity | variable | | |
| 26 | 102.856 | 7.777 | 1.43700 | 95.10 |
| 27 | −79.801 | 3.669 | | |
| 28 | −73.068 | 2.400 | 1.78590 | 43.93 |
| 29 | 65.569 | 3.596 | | |
| 30 | 67.351 | 12.291 | 1.43700 | 95.10 |
| 31 | −68.055 | 0.300 | | |
| 32 | 37.161 | 15.685 | 1.43700 | 95.10 |
| 33 | −142.175 | 13.086 | | |
| 34 | −56.284 | 2.200 | 1.69680 | 55.46 |
| 35 | 37.053 | 4.979 | | |
| 36 | 51.917 | 8.761 | 1.49700 | 81.61 |
| 37 | −153.910 | variable | | |
| 38 | 89.286 | 6.663 | 1.49700 | 81.61 |
| 39 | infinity | 0.388 | | |
| 40 | 93.824 | 6.452 | 1.59282 | 68.62 |
| 41 | infinity | 20.337 | | |
| 42 | infinity | 25.400 | 1.51680 | 64.20 |
| 43 | infinity | 2.000 | | |
| 44 | infinity | 3.000 | 1.48749 | 70.44 |
| 45 | infinity | 0.483 | | |
| image(IM) | infinity | | | |

Miscellaneous Data
zoom ratio 1.49

| | (W) | (M) | (T) |
|---|---|---|---|
| Fl | 26.325 | 32.831 | 39.235 |
| Fno. | 2.326 | 2.462 | 2.600 |
| ω | 27.385 | 21.936 | 18.349 |
| ymax | 12.545 | 12.545 | 12.545 |
| TL | 334.013 | 333.997 | 333.991 |
| BF | 41.600 | 41.584 | 41.578 |
| d14 | 23.292 | 23.797 | 15.124 |
| d18 | 34.246 | 14.926 | 7.512 |
| d20 | 3.787 | 22.602 | 38.690 |
| d25 | 28.534 | 14.813 | 2.179 |
| d37 | 2.000 | 15.721 | 28.355 |

Zoom Lens Group Data

| Group | (Surface i) | Focal Length |
|---|---|---|
| 1 | (1-14) | −88.864 |
| 2 | (15-18) | −425.584 |
| 3 | (19-20) | 110.146 |
| 4 | (21-25) | −359.780 |
| 5 | (26-37) | 253.414 |
| 6 | (38-45) | 85.363 |

Example 2

Unit: mm

Surface Data

| i | r | d | nd | vd |
|---|---|---|---|---|
| object(SC) | infinity | 3140.000 | | |
| 1 | 179.442 | 2.800 | 1.63854 | 55.45 |
| 2 | 43.519 | 9.886 | | |
| 3 | −701.017 | 2.500 | 1.49700 | 81.61 |
| 4 | 64.293 | 9.860 | | |

-continued

Unit: mm

| | | | | |
|---|---|---|---|---|
| 5 | −110.310 | 2.400 | 1.49700 | 81.61 |
| 6 | 131.179 | 0.589 | | |
| 7 | 80.027 | 12.376 | 1.54072 | 47.20 |
| 8 | −69.901 | 1.712 | | |
| 9 | −123.849 | 3.500 | 1.56883 | 56.04 |
| 10 | 367.356 | 7.807 | | |
| 11 | −142.126 | 3.600 | 1.75520 | 27.53 |
| 12 | 129.418 | 2.639 | | |
| 13 | 145.534 | 9.968 | 1.83481 | 42.72 |
| 14 | −93.214 | variable | | |
| 15 | −142.803 | 3.800 | 1.58144 | 40.89 |
| 16 | 81.385 | 3.867 | | |
| 17 | 125.083 | 7.183 | 1.90366 | 31.31 |
| 18 | −1195.211 | variable | | |
| 19 | 84.178 | 9.104 | 1.59282 | 68.62 |
| 20 | −293.893 | variable | | |
| 21 | −165.934 | 2.100 | 1.43700 | 95.10 |
| 22 | 92.595 | 2.933 | | |
| 23 | 113.474 | 4.237 | 1.67270 | 32.17 |
| 24 | 408.343 | 3.448 | | |
| 25(ST) | infinity | variable | | |
| 26 | 90.826 | 8.198 | 1.43700 | 95.10 |
| 27 | −96.717 | 3.937 | | |
| 28 | −78.872 | 3.400 | 1.78590 | 43.93 |
| 29 | 57.836 | 2.141 | | |
| 30 | 56.539 | 11.593 | 1.43700 | 95.10 |
| 31 | −69.419 | 0.300 | | |
| 32 | 34.114 | 16.060 | 1.43700 | 95.10 |
| 33 | −151.490 | 13.384 | | |
| 34 | −46.849 | 2.200 | 1.69680 | 55.46 |
| 35 | 36.076 | 5.470 | | |
| 36 | 59.051 | 8.941 | 1.49700 | 81.61 |
| 37 | −83.223 | variable | | |
| 38 | 89.286 | 5.533 | 1.49700 | 81.61 |
| 39 | infinity | 0.300 | | |
| 40 | 90.061 | 6.445 | 1.59282 | 68.62 |
| 41 | infinity | 17.972 | | |
| 42 | infinity | 25.400 | 1.51680 | 64.20 |
| 43 | infinity | 2.000 | | |
| 44 | infinity | 3.000 | 1.48749 | 70.44 |
| 45 | infinity | 0.483 | | |
| image(IM) | infinity | | | |

Miscellaneous Data
zoom ratio 1.50

| | (W) | (M) | (T) |
|---|---|---|---|
| Fl | 26.074 | 32.601 | 39.029 |
| Fno. | 2.309 | 2.455 | 2.600 |
| ω | 26.869 | 21.648 | 18.172 |
| ymax | 12.545 | 12.545 | 12.545 |
| TL | 334.032 | 334.027 | 334.020 |
| BF | 39.254 | 39.249 | 39.242 |
| d14 | 18.353 | 24.286 | 19.606 |
| d18 | 48.639 | 24.710 | 13.891 |
| d20 | 3.255 | 21.251 | 36.749 |
| d25 | 28.322 | 14.506 | 2.000 |
| d37 | 2.000 | 15.816 | 28.322 |

Zoom Lens Group Data

| Group | (Surface i) | Focal Length |
|---|---|---|
| 1 | (1-14) | −98.510 |
| 2 | (15-18) | −348.615 |
| 3 | (19-20) | 111.378 |
| 4 | (21-25) | −334.810 |
| 5 | (26-37) | 238.567 |
| 6 | (38-45) | 83.316 |

Example 3

Unit: mm

Surface Data

| i | r | d | nd | vd |
|---|---|---|---|---|
| object(SC) | infinity | 3140.000 | | |
| 1 | 144.186 | 3.800 | 1.63854 | 55.45 |
| 2 | 39.427 | 10.663 | | |
| 3 | −244.703 | 2.500 | 1.49700 | 81.61 |
| 4 | 70.300 | 11.139 | | |
| 5 | −89.640 | 3.400 | 1.49700 | 81.61 |
| 6 | 168.419 | 1.803 | | |
| 7 | 74.728 | 12.656 | 1.54072 | 47.20 |
| 8 | −64.714 | 4.009 | | |
| 9 | −56.871 | 3.500 | 1.56883 | 56.04 |
| 10 | −145.515 | 7.896 | | |
| 11 | −167.658 | 3.600 | 1.75520 | 27.53 |
| 12 | 110.667 | 3.486 | | |
| 13 | 166.833 | 9.659 | 1.83481 | 42.72 |
| 14 | −98.379 | variable | | |
| 15 | −280.303 | 3.800 | 1.58144 | 40.89 |
| 16 | 76.680 | 3.792 | | |
| 17 | 109.197 | 6.313 | 1.90366 | 31.31 |
| 18 | 911.781 | variable | | |
| 19 | 77.500 | 9.262 | 1.59282 | 68.62 |
| 20 | −373.518 | variable | | |
| 21 | −137.730 | 2.100 | 1.43700 | 95.10 |
| 22 | 112.417 | 3.660 | | |
| 23 | 310.249 | 4.229 | 1.67270 | 32.17 |
| 24 | −318.429 | 3.000 | | |
| 25(ST) | infinity | variable | | |
| 26 | 112.265 | 7.836 | 1.43700 | 95.10 |
| 27 | −71.987 | 3.685 | | |
| 28 | −65.510 | 2.400 | 1.78590 | 43.93 |
| 29 | 65.515 | 2.683 | | |
| 30 | 65.454 | 12.084 | 1.43700 | 95.10 |
| 31 | −66.412 | 0.300 | | |
| 32 | 36.753 | 14.304 | 1.43700 | 95.10 |
| 33 | −152.480 | 13.780 | | |
| 34 | −56.527 | 2.200 | 1.69680 | 55.46 |
| 35 | 36.726 | 4.945 | | |
| 36 | 51.622 | 8.632 | 1.49700 | 81.61 |
| 37 | −152.449 | variable | | |
| 38 | 89.286 | 6.098 | 1.49700 | 81.61 |
| 39 | infinity | 0.608 | | |
| 40 | 90.889 | 6.580 | 1.59282 | 68.62 |
| 41 | infinity | 20.339 | | |
| 42 | infinity | 25.400 | 1.51680 | 64.20 |
| 43 | infinity | 2.000 | | |
| 44 | infinity | 3.000 | 1.48749 | 70.44 |
| 45 | infinity | 0.483 | | |
| image(IM) | infinity | | | |

Miscellaneous Data
zoom ratio 1.49

| | (W) | (M) | (T) |
|---|---|---|---|
| Fl | 26.319 | 32.830 | 39.244 |
| Fno. | 2.336 | 2.468 | 2.600 |
| ω | 27.374 | 21.934 | 18.350 |
| ymax | 12.545 | 12.545 | 12.545 |
| TL | 334.010 | 333.996 | 333.998 |
| BF | 41.599 | 41.585 | 41.587 |
| d14 | 23.933 | 27.077 | 18.926 |
| d18 | 36.028 | 13.544 | 4.819 |
| d20 | 3.551 | 20.591 | 34.910 |
| d25 | 26.498 | 14.428 | 3.674 |
| d37 | 2.000 | 16.371 | 29.681 |

Zoom Lens Group Data

| Group | (Surface i) | Focal Length |
|---|---|---|
| 1 | (1-14) | −89.594 |
| 2 | (15-18) | −473.967 |

-continued

Unit: mm

| | | |
|---|---|---|
| 3 | (19-20) | 109.100 |
| 4 | (21-25) | -378.672 |
| 5 | (26-37) | 326.935 |
| 6 | (38-45) | 83.900 |

Example 4

Unit: mm
Surface Data

| i | r | d | nd | vd |
|---|---|---|---|---|
| object(SC) | infinity | 3140.000 | | |
| 1 | -4444.644 | 2.800 | 1.63854 | 55.45 |
| 2 | 57.387 | 6.835 | | |
| 3 | -490.383 | 2.500 | 1.49700 | 81.61 |
| 4 | 186.143 | 14.488 | | |
| 5 | -47.561 | 4.593 | 1.54072 | 47.20 |
| 6 | -39.593 | 3.891 | | |
| 7 | -37.054 | 2.500 | 1.56883 | 56.04 |
| 8 | -101.826 | 5.000 | | |
| 9 | infinity | 2.600 | 1.75520 | 27.53 |
| 10 | 233.255 | 2.786 | | |
| 11 | 310.678 | 8.739 | 1.83481 | 42.72 |
| 12 | -77.358 | variable | | |
| 13 | -75.964 | 2.800 | 1.72342 | 37.99 |
| 14 | 102.463 | 2.582 | | |
| 15 | 112.007 | 13.090 | 1.59349 | 67.00 |
| 16 | -66.755 | variable | | |
| 17 | 190.667 | 6.607 | 1.59282 | 68.62 |
| 18 | -250.251 | variable | | |
| 19 | -91.590 | 2.100 | 1.43700 | 95.10 |
| 20 | 42.358 | 2.739 | | |
| 21 | 45.606 | 7.903 | 1.67270 | 32.17 |
| 22 | 297.242 | 21.887 | | |
| 23(ST) | infinity | 20.595 | | |
| 24 | 309.983 | 8.840 | 1.43700 | 95.10 |
| 25 | -44.672 | 4.558 | | |
| 26 | -35.545 | 2.400 | 1.78590 | 43.93 |
| 27 | 82.961 | 2.668 | | |
| 28 | 126.604 | 12.244 | 1.43700 | 95.10 |
| 29 | -42.199 | 0.300 | | |
| 30 | -319.906 | 13.574 | 1.43700 | 95.10 |
| 31 | -37.600 | 0.300 | | |
| 32 | -45.190 | 2.200 | 1.69680 | 55.46 |
| 33 | -210.502 | 0.300 | | |
| 34 | 190.991 | 10.638 | 1.49700 | 81.61 |
| 35 | -82.544 | 2.000 | | |
| 36 | 86.597 | 9.546 | 1.49700 | 81.61 |
| 37 | -1111.427 | 66.294 | | |
| 38 | infinity | 25.400 | 1.51680 | 64.20 |
| 39 | infinity | 2.000 | | |
| 40 | infinity | 3.000 | 1.48749 | 70.44 |
| 41 | infinity | 0.483 | | |
| image(IM) | infinity | | | |

Miscellaneous Data
zoom ratio 1.18

| | (W) | (M) | (T) |
|---|---|---|---|
| Fl | 33.474 | 36.484 | 39.492 |
| Fno. | 2.600 | 2.600 | 2.600 |
| ω | 22.173 | 20.214 | 18.574 |
| ymax | 12.545 | 12.545 | 12.545 |
| TL | 334.003 | 334.009 | 334.015 |
| BF | 87.547 | 87.552 | 87.558 |

-continued

Unit: mm

| | | | |
|---|---|---|---|
| d12 | 9.000 | 10.000 | 3.000 |
| d16 | 26.586 | 9.841 | 2.300 |
| d18 | 4.266 | 20.011 | 34.552 |

Zoom Lens Group Data

| Group | (Surface i) | Focal Length |
|---|---|---|
| 1 | (1-12) | -185.161 |
| 2 | (13-16) | -1159.062 |
| 3 | (17-18) | 183.568 |
| 4 | (19-41) | 76.223 |

TABLE 1

| Conditional Formula Values, etc. | | Example 1 | Example 2 | Example 3 | Example 4 |
|---|---|---|---|---|---|
| (1) | $|f1f|/L1r$ | 0.89 | 0.94 | 0.86 | 0.94 |
| (2) | L2max/L3max | 0.25 | 0.18 | 0.23 | 0.23 |
| (3) | νp − νm | 15.19 | 15.19 | 15.19 | 15.19 |
| (4) | $|f1f/f1r|$ | 0.17 | 0.22 | 0.16 | 0.42 |
| | f1f | -51.77 | -50.14 | -52.48 | -40.11 |
| | f1r | 306.33 | 230.98 | 329.75 | 96.25 |
| | L1r | 58.32 | 53.43 | 61.37 | 42.61 |
| | L2max | 8.67 | 5.93 | 8.15 | 7.00 |
| | L3max | 34.90 | 33.49 | 36.22 | 30.29 |

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A projection optical system that projects, while enlarging, an image displayed on an image display surface and performs zooming by moving a plurality of lens groups arranged along a same optical axis, the projection optical system comprising, from an enlargement side:
   a first lens group having a negative refractive power;
   a second lens group having a negative refractive power and movable during zooming;
   a third lens group having a positive refractive power and movable during zooming; and
   a lens group disposed at a most reduction-side position, wherein
   the first lens group comprises, from the enlargement side:
      a front group having a negative refractive power; and
      a rear group having a positive refractive power and comprising, from the enlargement side, a negative lens element and a positive lens element,
   for zooming from a wide-angle end to a telephoto end, the third lens group moves toward the enlargement side monotonically, and
   conditional formulae (1) and (2) below are fulfilled:

$$0.3 < |f1f|/L1r < 1.4 \quad (1)$$

$$0.1 < L2\text{max}/L3\text{max} < 0.3 \quad (2)$$

where
f1f represents a focal length of the front group;
L1r represents a distance from a vertex of a most enlargement-side surface in the front group to a vertex of a most enlargement-side of the rear group;

L2max represents a maximum amount of movement of the second lens group; and

L3max represents a maximum amount of movement of the third lens group.

2. The projection optical system according to claim 1, wherein conditional formula (3) below is fulfilled:

$$vp-vm>0 \qquad (3)$$

where vp represents a dispersion of the positive lens element in the rear group; and vm represents a dispersion of the negative lens element in the rear group.

3. The projection optical system according to claim 1, wherein the front group comprises two lens elements.

4. The projection optical system according to claim 1, wherein the front group comprises a positive lens element.

5. The projection optical system according to claim 1, wherein the first lens group remains stationary during zooming.

6. The projection optical system according to claim 1, wherein for zooming from the wide-angle end to the telephoto end, the second lens group moves while describing a locus convex to a reduction side.

7. The projection optical system according to claim 1, further comprising, on a reduction side of the third lens group and from the enlargement side:

a fourth lens group having a negative refractive power;

a fifth lens group having a positive refractive power; and a sixth lens group having a positive refractive power, wherein at least the fifth lens group is movable during zooming.

8. The projection optical system according to claim 1, wherein conditional formula (4) below is fulfilled:

$$0.1<|flf/flr|<0.5 \qquad (4)$$

where flf represents a focal length of the front group; and flr represents a focal length of the rear group.

9. The projection optical system according to claim 1, wherein the projection optical system is usable with light of a wavelength of 800 nm or more.

10. A projector comprising:

an image display element having the image display surface; and the projection optical system according to claim 1 that projects, while enlarging, the image displayed on the image display surface onto a screen surface.

* * * * *